US010907729B2

(12) United States Patent
Sage et al.

(10) Patent No.: US 10,907,729 B2
(45) Date of Patent: Feb. 2, 2021

(54) WIRE-BASED TRANSMISSION SHIFTER WITH INTEGRATED ELECTRICAL SWITCH CONTROL

(71) Applicant: GHSP, Inc., Grand Haven, MI (US)

(72) Inventors: Ian Patrick Sage, Holland, MI (US); Gary Douglas Kortge, Fremont, MI (US); Todd Michael Burghgraef, Caledonia, MI (US)

(73) Assignee: GHSP, Inc., Grand Haven, MI (US)

( * ) Notice: Subject to any disclaimer, the term of this patent is extended or adjusted under 35 U.S.C. 154(b) by 0 days.

(21) Appl. No.: 16/280,712

(22) Filed: Feb. 20, 2019

(65) Prior Publication Data

US 2019/0257412 A1 Aug. 22, 2019

Related U.S. Application Data

(60) Provisional application No. 62/632,586, filed on Feb. 20, 2018.

(51) Int. Cl.
*F16H 59/12* (2006.01)
*H01H 13/84* (2006.01)
*H01H 13/807* (2006.01)
*H01H 13/803* (2006.01)
*H01H 13/83* (2006.01)
*F16H 59/02* (2006.01)

(52) U.S. Cl.
CPC ........... *F16H 59/12* (2013.01); *H01H 13/803* (2013.01); *H01H 13/807* (2013.01); *H01H 13/84* (2013.01); *F16H 2059/026* (2013.01); *H01H 13/83* (2013.01); *H01H 2217/006* (2013.01); *H01H 2217/008* (2013.01); *H01H 2225/01* (2013.01)

(58) Field of Classification Search
CPC .. F16H 59/12; F16H 2059/026; F16H 59/044; F16H 59/105; H01H 13/803; H01H 13/807; H01H 13/84; H01H 13/83; H01H 2217/006; H01H 2217/008; H01H 2225/01
See application file for complete search history.

(56) References Cited

U.S. PATENT DOCUMENTS

| | | | | |
|---|---|---|---|---|
| 5,561,416 A | * | 10/1996 | Marshall | B60K 37/06 340/456 |
| 6,056,669 A | * | 5/2000 | Marshall | F16H 59/12 340/456 |
| 6,295,887 B1 | * | 10/2001 | DeJonge | B60K 37/06 74/473.3 |
| 9,683,655 B2 | * | 6/2017 | Ishino | F16H 59/12 |
| 10,336,186 B2 | * | 7/2019 | Woodhouse | F16H 59/12 |

* cited by examiner

Primary Examiner — Randell J Krug
(74) Attorney, Agent, or Firm — Price Heneveld LLP (57) ABSTRACT

A transmission shifter includes a base defining P, R, N, D gear positions; four electrical dome switches associated with each of the P, R, N, D gear positions, and analog and digital circuits operably connected to the electrical switches, respectively, and associated with the P, R, N, D gear positions. The dome switches are arranged in different patterns in each of the different gear positions, and in combination with pushbutton actuators operate with different actuator motions and with different closure distances and forces to cause reliable ad confirmed intentional actuation, including redundancy. The switches are operably connected to analog and digital circuits, which provides additional functional advantage, reliability, and certainty of intentional operation.

8 Claims, 9 Drawing Sheets

WIRE-BASED TRANSMISSION SHIFTER WITH INTEGRATED ELECTRICAL SWITCH CONTROL

CROSS-REFERENCE TO RELATED APPLICATION

This application claims priority to and the benefit under 35 U.S.C. § 119(e) of U.S. Provisional Patent Application No. 62/632,586, filed on Feb. 20, 2018, entitled "WIRE-BASED TRANSMISSION SHIFTER WITH INTEGRATED ELECTRICAL SWITCH CONTROL," by Ian Patrick Sage et al., the entire disclosure of which is incorporated herein by reference.

BACKGROUND

The present invention relates wire-based transmission shifters with integrated electrical switch control, and more particularly relates to a transmission shifter with wire-based electrical switches positioned and constructed to meet OEM functional requirements, safety and regulatory requirements, and quality, cost, reliability, and assemble-ability requirements typical in the automotive industry.

Known vehicle transmission shifters are often more complex than desired, and historically often include multiple and/or expensive mechanical components. There is a desire by original equipment manufacturers (OEMs) to further simplify new vehicle transmission shifters in modern vehicles, by taking greater advantage of electrical components and by using fewer "purely mechanical" and "mechanically-complex" components. At the same time, for cost and quality reasons, OEMs prefer standardized and reliable components that maintain the high functional, safety, and regulatory requirements now in place, yet while optimizing cost and assemble-ability. Also, there is a desire to incorporate design flexibility and "modify-ability" of new shifter systems.

SUMMARY OF THE PRESENT INVENTION

In one aspect of the present invention, a transmission shifter comprises a base defining Park, Reverse, Neutral, Drive gear positions; at least two separate Park electrical switches mounted on the base and associated with the Park gear position; a Park gear selector component associated with the Park gear position and configured to actuate both of the Park electrical switches upon manipulation of the Park gear selector component; at least two separate Reverse electrical switches mounted on the base and associated with the Reverse gear position; a Reverse gear selector component associated with the Reverse gear position and configured to actuate both of the Reverse electrical switches upon manipulation of the Reverse gear selector component; at least two separate Neutral electrical switches mounted on the base and associated with the Neutral gear position; a Neutral gear selector component associated with the Neutral gear position and configured to actuate both of the Neutral electrical switches upon manipulation of the Neutral gear selector component; at least two separate Drive electrical switches mounted on the base and associated with the Drive gear position; and a Drive gear selector component associated with the Drive gear position and configured to actuate both of the Drive electrical switches upon manipulation of the Drive gear selector component.

In another aspect of the present invention, a transmission shifter comprises a base defining Park, Reverse, Neutral, and Drive gear positions; Park, Reverse, Neutral, and Drive dome electrical switch arrangements; and separate Park, Reverse, Neutral, and Drive gear selector components for operating dome electrical switches in each of the Park, Reverse, Neutral, and Drive dome electrical switch arrangements with each being associated with one of the Park, Reverse, Neutral, and Drive gear positions, respectively, wherein at least one set of the dome electrical switches includes a first dome electrical switch and a second dome electrical switch, the first and second dome electrical switches being constructed to close at different times during movement of the associated separate Park, Reverse, Neutral, and Drive gear selector component.

In another aspect of the present invention, a transmission shifter comprises a base defining P, R, N, D gear positions; at least one dome electrical switch at each of the P, R, N, D gear positions; and P, R, N, D pushbutton actuator components for operating the at least one dome electrical switch at each of the P, R, N, D gear positions, respectively.

In another aspect of the present invention, a transmission shifter comprises a base defining gear positions including a Reverse gear shift position; at least two electrical switches associated with the Reverse gear shift position for closing an electrical circuit for shifting a transmission to a Reverse gear position; and a Reverse gear selector component on the base for selectively closing the at least two electrical switches to shift the transmission to the Reverse gear position, the Reverse gear selector component being mounted on the base to move in at least two distinctly different directions to close the at least two electrical switches.

In another aspect of the present invention, a transmission shifter comprises a base defining Park, Reverse, Neutral, Drive gear positions; electrical switches associated with each of the Park, Reverse, Neutral, Drive gear positions on the base; and Park, Reverse, Neutral, Drive circuits operably connected to the electrical switches, respectively, and associated with the Park, Reverse, Neutral, Drive gear positions respectively; wherein at least one of the electrical switches for each of the Park, Reverse, Neutral, Drive gear positions is configured to output an analog signal to a respective one of the Park, Reverse, Neutral, Drive circuits; and wherein at least one other of the electrical switches for each of the Park, Reverse, Neutral, Drive gear positions is configured to output a digital signal to a respective one of the Park, Reverse, Neutral, Drive circuits.

Related methods are also innovative and form a part of the present inventive subject matter.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
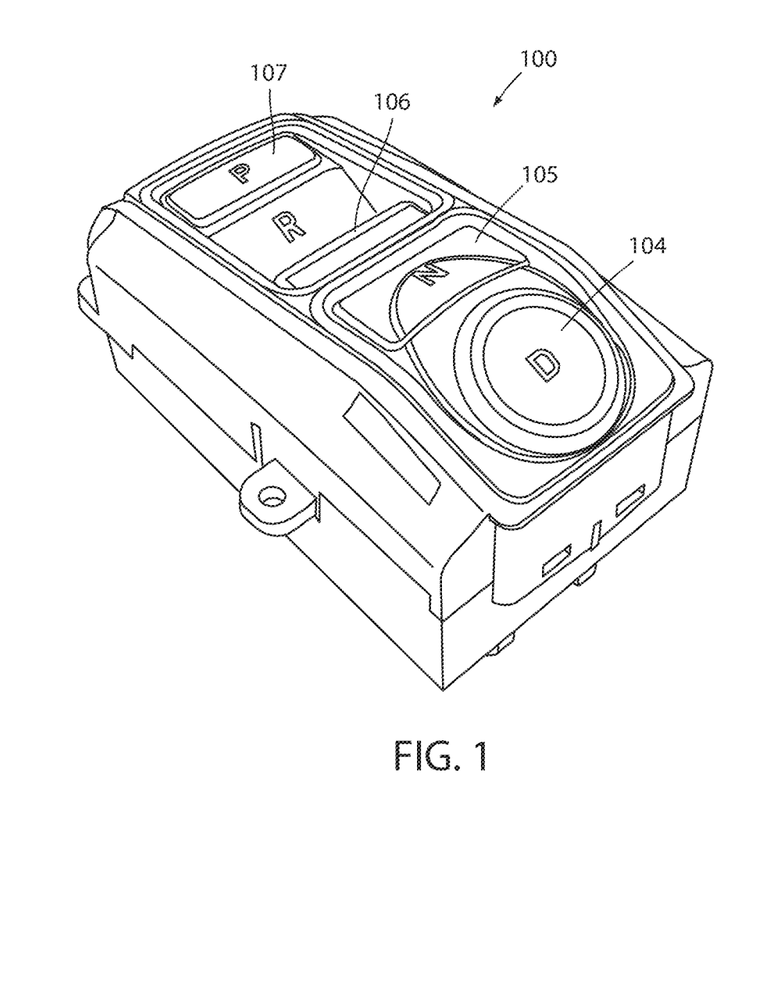
FIG. 1 is a top and front perspective view of an electrically-based transmission shifter embodying the present invention.
Figure 2:
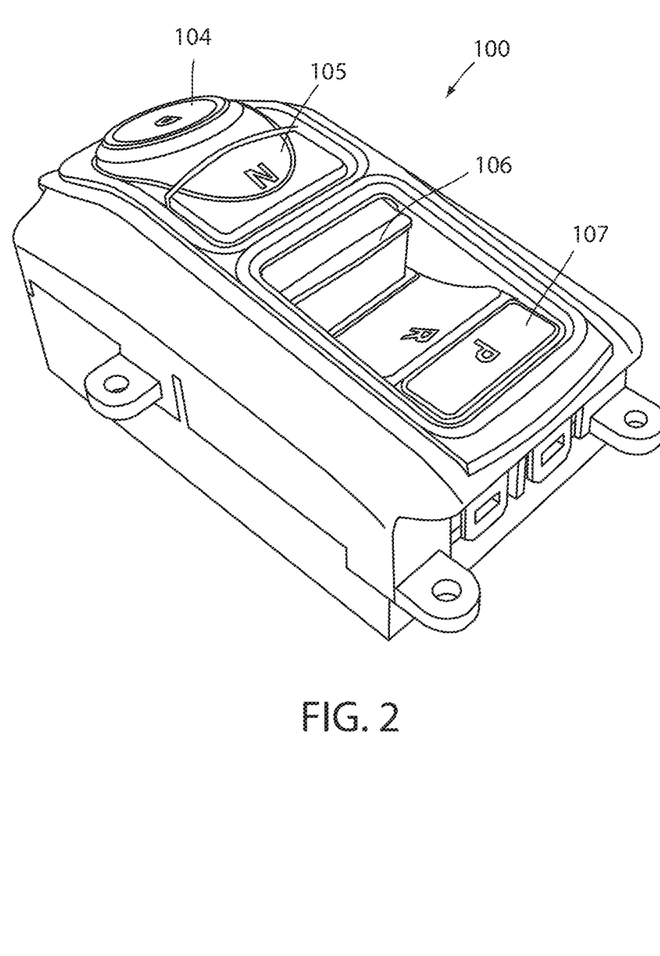
FIG. 2 is a top and rear perspective view of the electrically-based transmission shifter shown in FIG. 1.
Figure 3:
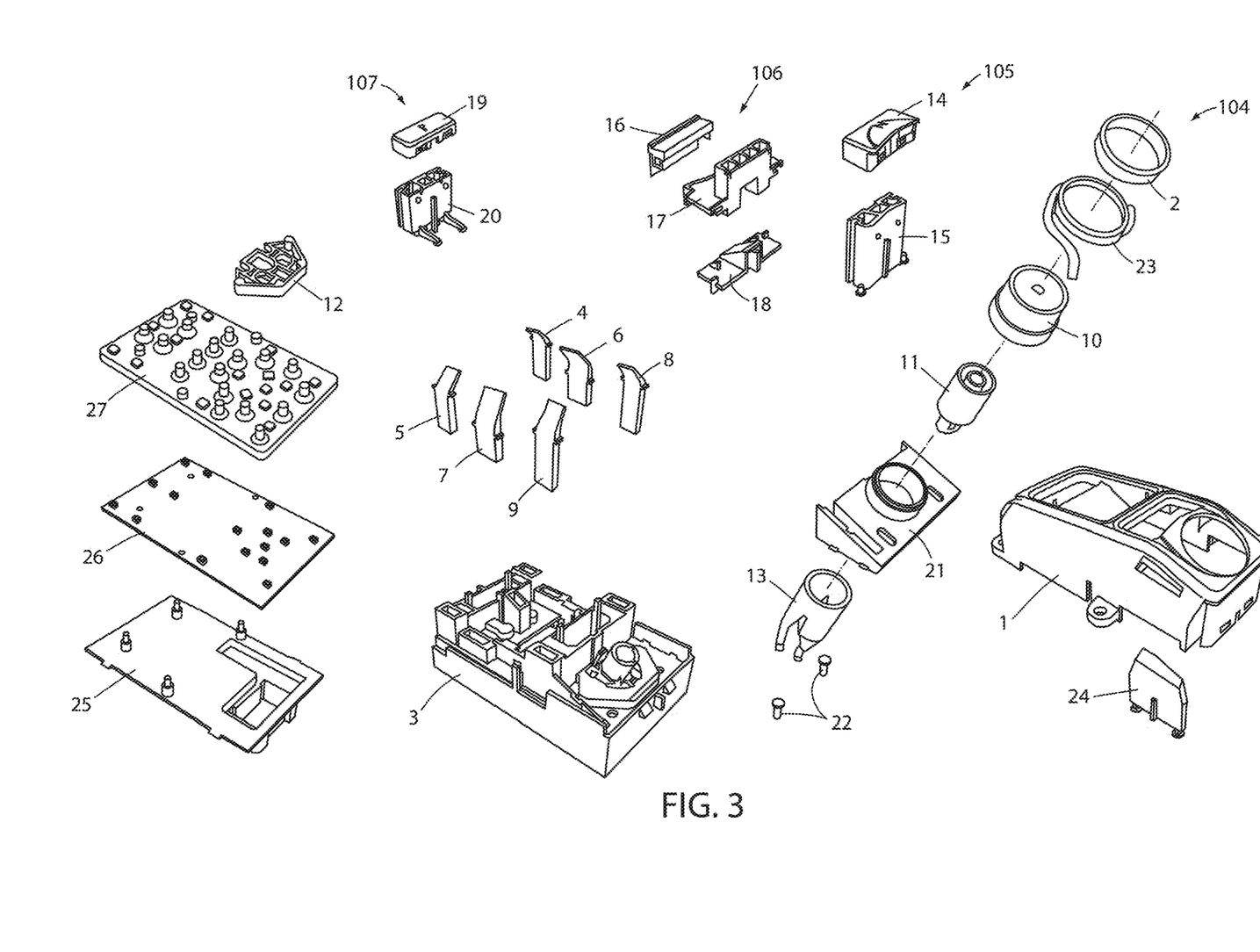
FIG. 3 is an exploded view of FIG. 1 showing components therein.

The present apparatus is a wire-based transmission shifter 100 (FIGS. 1-3) that includes a base that may comprise an upper housing 1, a lower housing 25, a primary skeleton 3, and optionally a secondary skeleton 21, FIG. 3) defining Park, Reverse, Neutral, and Drive gear locations (also called "gear positions" herein); with four electrical dome switches 127 (FIG. 4) associated with each of the Park, Reverse, Neutral, and Drive gear positions, and analog circuits 101 and digital circuits 102 (FIG. 11) operably connected to the electrical switches 127, respectively, and associated with the Park, Reverse, Neutral, and Drive gear positions. The dome switches 127 may be arranged in different patterns in each of the different gear positions (FIG. 4), including a square pattern for the Park gear position, a linear pattern for the Reverse gear position, a right hand (RH) arc pattern for the Neutral gear position, and a left hand (LH) arc pattern for the Drive gear position. The switches 127 are actuated by gear selector components 104-107.

Figure 5:
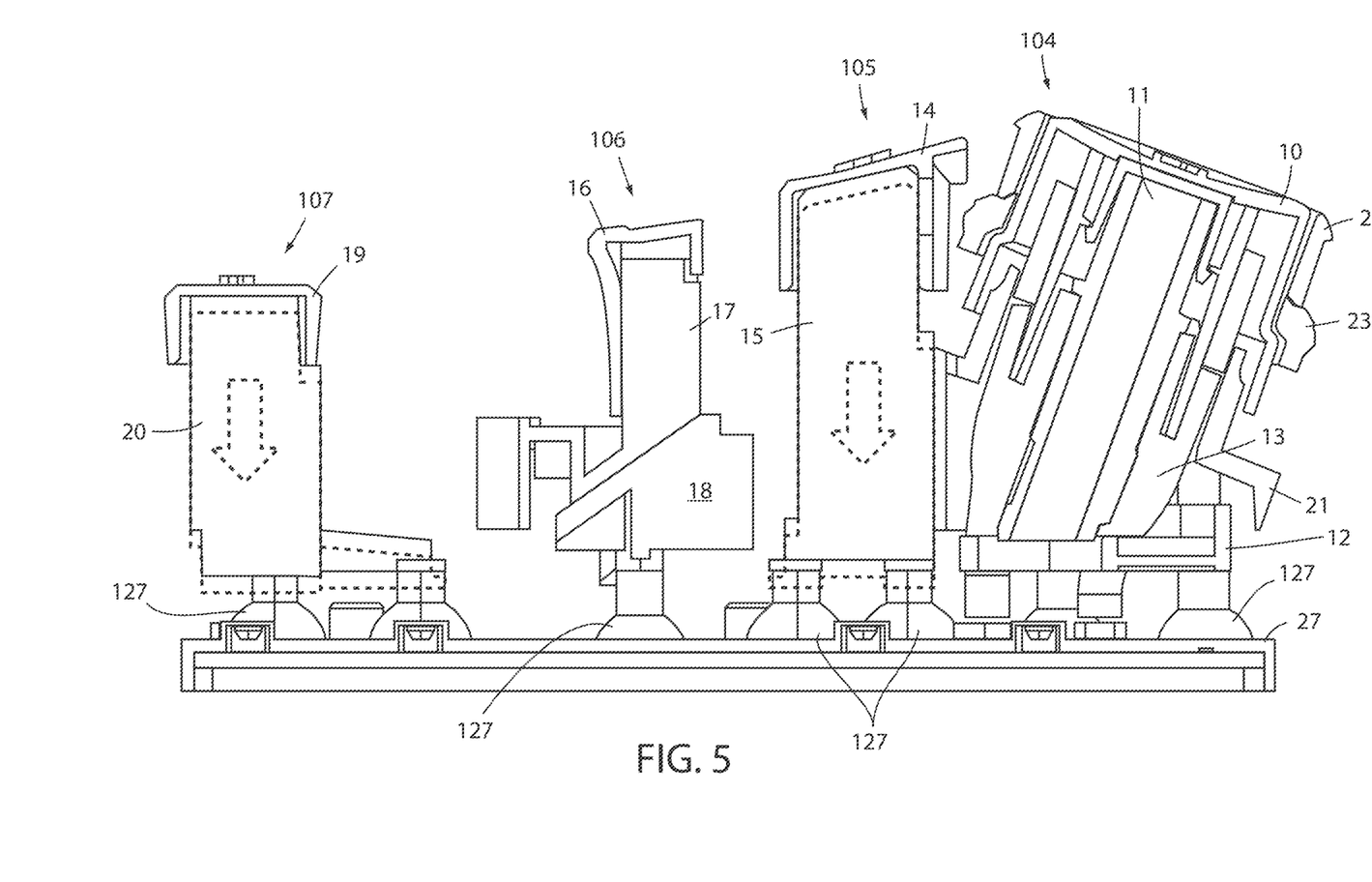
FIG. 5 is a cross sectional side view of a portion of the transmission shifter shown in FIGS. 1-3 and showing actuation motions for Park and Neutral gear positions.
Figure 6:
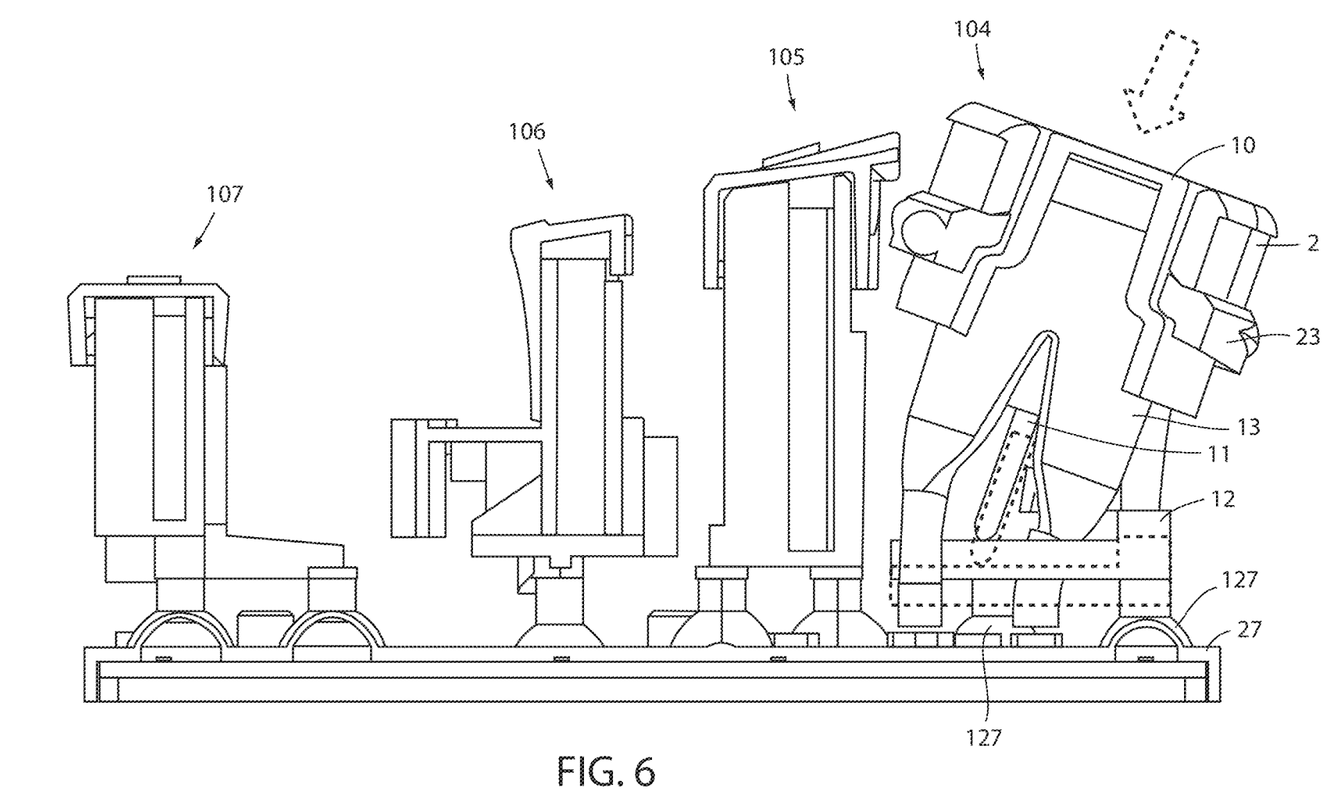
FIG. 6 is a cross sectional side view of a portion of the transmission shifter shown in FIGS. 1-3 and showing actuation motion for Drive gear position.

As best shown in FIGS. 3 and 5-7, Drive selector component 104 includes a pushbutton cap 10, a primary plunger 11, and a secondary plunger 12, and optionally a panel ring 2, a primary light pipe for drive indication 13, panel ring leg light pipes 22, and a panel ring light pipe 23. When a user presses on the pushbutton cap 10, which is coupled to the primary plunger 11, the primary plunger 11 slides downward through the apertures in the primary skeleton 3, the secondary skeleton 21, and the primary light pipe 13 to engage the secondary plunger 12, which in turn presses down on the associated electrical switches 127 underlying the secondary plunger 12. The associated electrical switches 127 are thus activated thereby indicating selection of the Drive gear. When the Drive selector component 104 is released, the primary and secondary plungers 11 and 12 spring upward and the associated electrical switches are deactivated. The Drive gear remains the selected gear, however, until another gear is selected. As shown in FIG. 6, the downward direction at which the primary plunger 11 moves is at an angle to a vertical axis as discussed further below. The secondary plunger 12 is provided to translate the angled motion of the primary plunger 11 into a vertical motion to evenly apply force to the associated electrical switches 127.

A Neutral gear selector component 105 includes a pushbutton cap 14 and a primary plunger 15 and optionally Neutral indication light pipes 8 and 9. When a user presses on the pushbutton cap 14, which is coupled to the primary plunger 15, the primary plunger 15 slides downward through the aperture in the primary skeleton 3 to press down on the associated electrical switches 127 underlying the primary plunger 15. The associated electrical switches 127 are thus activated thereby indicating selection of the Neutral gear. When the Neutral selector component 105 is released, the primary plunger 15 springs upward and the associated electrical switches 127 are deactivated. The Neutral gear remains the selected gear, however, until another gear is selected. As shown in FIG. 5, the downward direction at which the primary plunger 15 moves is parallel to a vertical axis as discussed further below.

Figure 7:
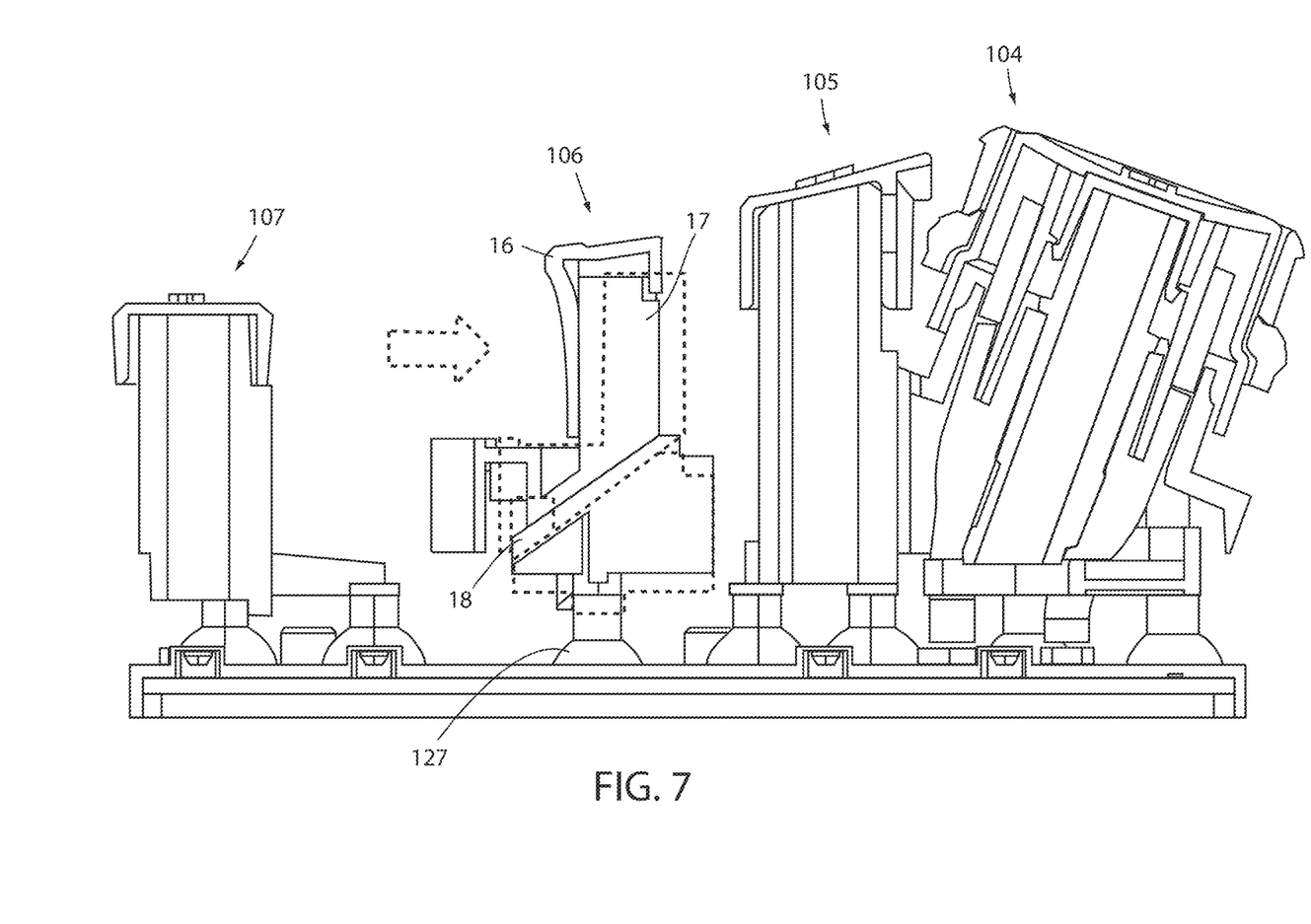
FIG. 7 is a cross sectional side view of a portion of the transmission shifter shown in FIGS. 1-3 and showing actuation motion for Reverse gear position.

A Reverse gear selector component 106 includes a pushbutton cap 16, a primary plunger 17, and a secondary plunger 18, and optionally Reverse indication light pipes 6 and 7. As shown in FIG. 7, when a user presses on the pushbutton cap 16, which is coupled to the primary plunger 17, the primary plunger 17 slides horizontally rearward through the aperture in the primary skeleton 3 to engage the secondary plunger 18, which translates the horizontal motion of the primary plunger 17 into a downward vertical motion so as to press down on the associated electrical switches 127 underlying the secondary plunger 18. The associated electrical switches 127 are thus activated thereby indicating selection of the Reverse gear. When the Reverse selector component 106 is released, the secondary plunger 18 springs upward and the associated electrical switches 127 are deactivated. The Reverse gear remains the selected gear, however, until another gear is selected. To translate the horizontal rearward motion of the primary plunger 17 into a vertical downward motion, the secondary plunger 18 has a second sloped ramp that slideably engages a first sloped ramp on the primary plunger 17.

A Park gear selector component 107 includes a pushbutton cap 19 and a primary plunger 20, and optionally Park indication light pipes 4 and 5. When a user presses on the pushbutton cap 19, which is coupled to the primary plunger 20, the primary plunger 20 slides downward through an aperture in the primary skeleton 3 to press down on the associated electrical switches 127 underlying the primary plunger 20. The associated electrical switches 127 are thus activated thereby indicating selection of the Park gear. When the Park selector component 107 is released, the primary plunger 20 springs upward and the associated electrical switches 127 are deactivated. The Park gear remains the selected gear, however, until another gear is selected. As shown in FIG. 5, the downward direction at which the primary plunger 205 moves is parallel to a vertical axis as discussed further below.

The electrical switches 127 may be dome switches (e.g., membrane switches). The spring force that returns the gear selector components to their undepressed positions may be provided by the dome switches.

The gear selector components 104-107 may operate with different actuator motions and with different closure distances and forces of their respective electrical switches 127, doing so in a manner that causes reliable and confirmed intentional actuation, including redundancy of switch closure. In particular, the Park and Neutral gear selector components 105 and 107 operate vertically downward onto the dome keypad 27 (FIG. 5) that supports the electrical switches. The Drive gear selector component 104 operates at a slight vertical angle (FIG. 6), and the Reverse gear selector component 106 operates with a horizontal sliding motion (FIG. 7). It is contemplated that alternative motions could also be used.

Figure 9A:
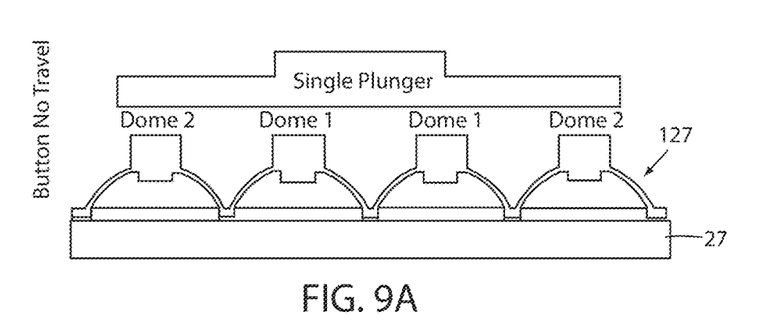
FIGS. 9A, 9B, and 9C are schematic side cross sectional views showing a button unpressed and located over a series of four dome switches.
Figure 9B:
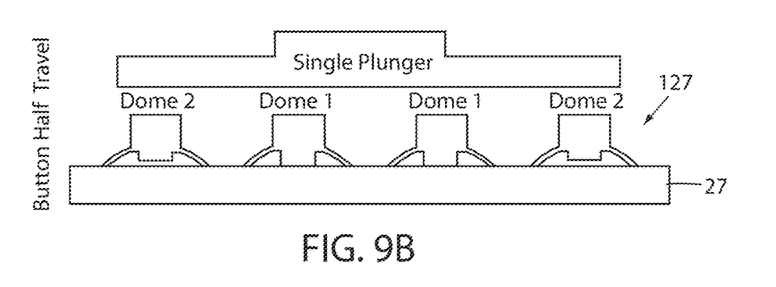
Figure 9C:
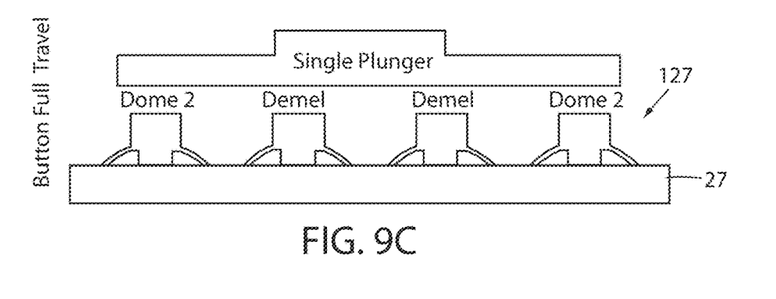
Figure 10:
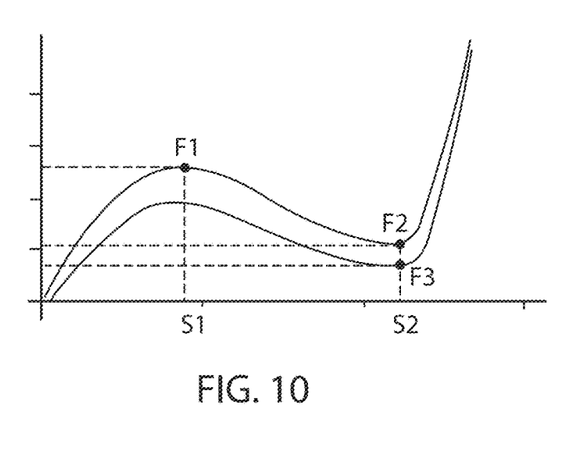
FIG. 10 is a chart showing force versus deflection data of the electrical switches used in the shifter shown in the above figures.

It is noted that the different contact arrangements relate to the actuation direction of the "human touch element" and how it comes down to the underlying board 27, including whether it is a direct downward press, or a slide plunger, or double-direction motion. Each of the gear selector components 104-107 act to initially cause a first pair of switches 127 to contact, and then upon further depression act to cause a second pair of switches 127 to contact. This is illustrated in FIGS. 9A-9C and helps differentiate an intentional touch from an accidental and non-intentional human touch signal. In particular, the two-step contact sequence enforces a predictability in the button actuator. If the button is actuated with a different pattern, then the electrical system treats this as an error and does not take action. Also, two of the button plungers are longer than the other two button plungers, which helps insure that the contacts will actuate in a certain pattern. The software detecting the actuation looks for this pattern. The double movement for "Reverse" helps with this decision process, and also helps meet legal standards promoted by FMVSS and IIHS.

Figure 4:
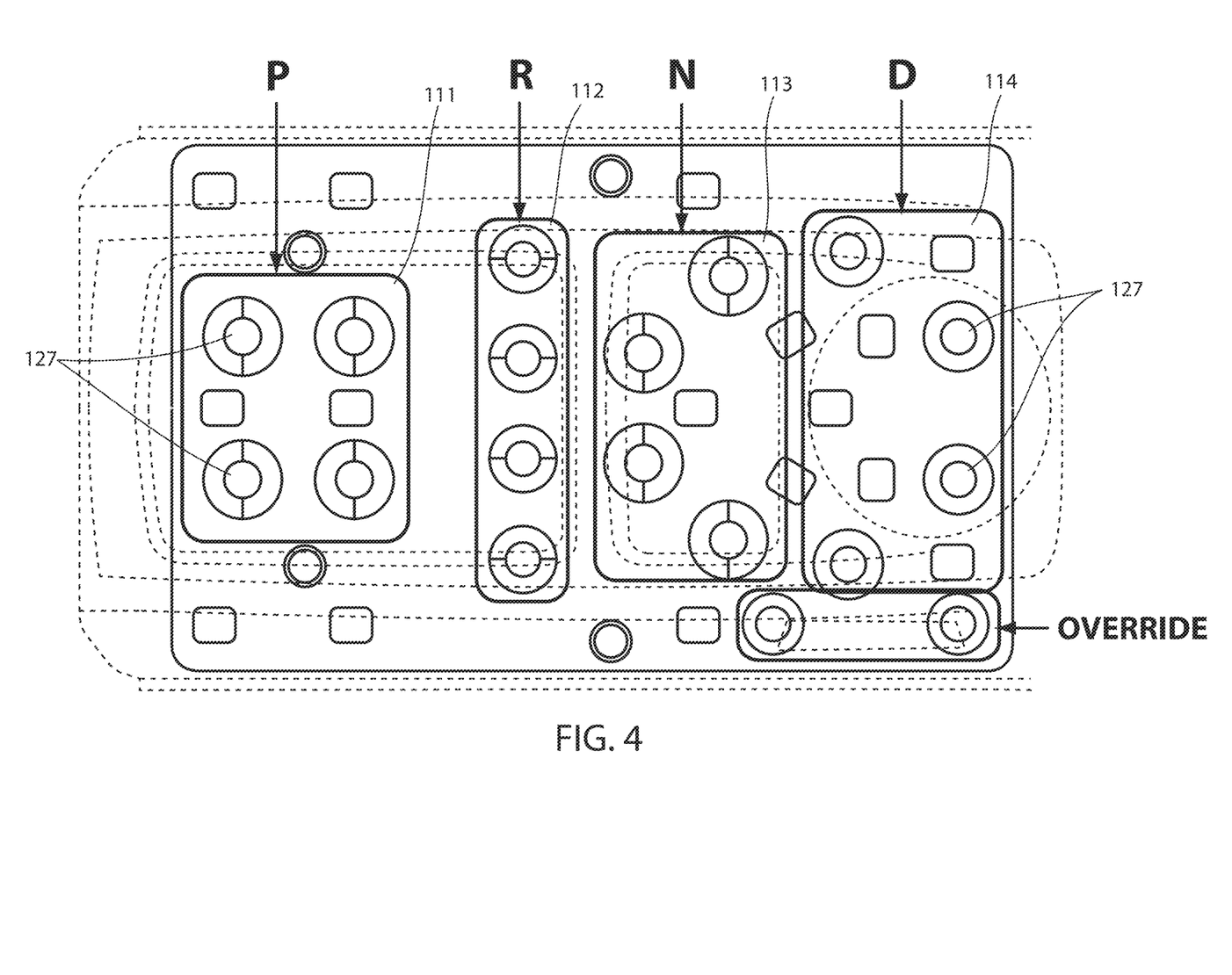
FIG. 4 is a top view of the transmission shifter shown in FIG. 1 but with components removed to expose the dome key pad 27.

FIG. 4 illustrates regions 111-115 each containing the four dome switches 127 associated with one of the Park, Reverse, Neutral, Drive and Override positions. Specifically, region 111 includes the four switches 127 associated with the Park gear position, region 112 includes the four switches 127 associated with the Reverse gear position, region 113 includes the four switches 127 associated with the Neutral gear position, region 114 includes the four switches 127 associated with the Drive gear position, and region 115 includes the four switches 127 associated with the Override position.

Figure 8:
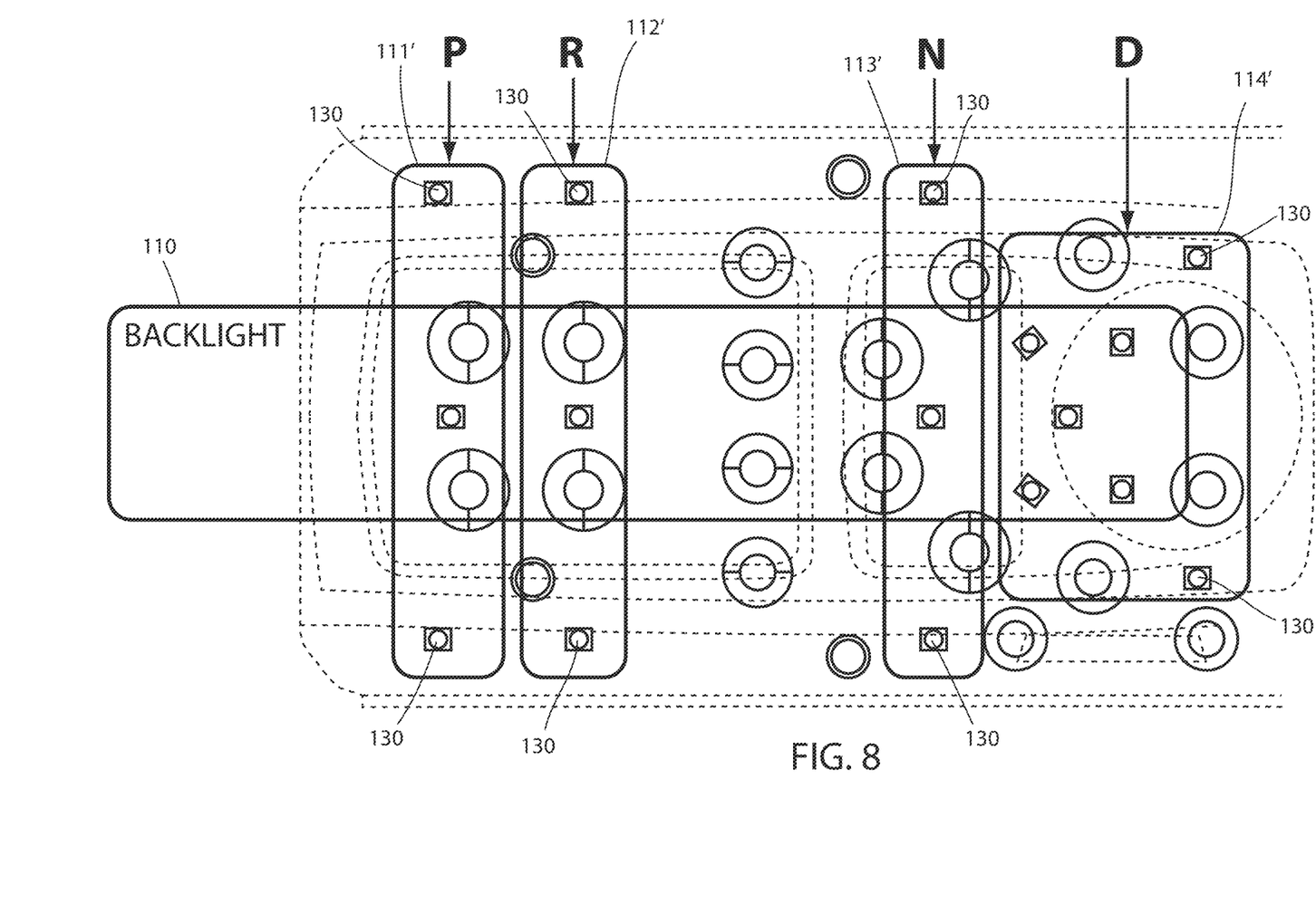
FIG. 8 is a plan view similar to FIG. 4 but showing the LEDs.

FIG. 8 is a plan view similar to FIG. 4 but showing a backlight region 110 and regions 111'-114' that include LEDs 130 that selectively illuminate the various light pipes. More specifically, the LEDs 130 in region 111' provide illumination to Park indication light pipes 4 and 5, the LEDs 130 in region 112' provide illumination to Reverse indication light pipes 6 and 7, the LEDs 130 in region 113' provide illumination to Neutral indication light pipes 8 and 9, and the LEDs 130 in region 114' provide illumination to Drive indication light pipe 13. The color and/or brightness of the light emitted from the LEDs may change to indicate the gear that is selected.

FIGS. 7A, 7B, and 7C are schematic side cross sectional views showing a schematic pushbutton (labelled as plunger), FIG. 9A shows a button unpressed and located over a series of four dome switches 127, with the dome switches 127 being linearly arranged similar to the Reverse gear position in FIG. 4), FIG. 9B shows a button partially depressed to actuate two of four dome switches 127, and FIG. 9C shows a button fully depressed to actuate all four dome switches 127.

The tables below shows differences in dome switches used above, including force of operation and distances to electrical contact. FIG. 8 shows a graph of force versus deflection data for the dome switches.

| Dome Specification | | |
|---|---|---|
| Dome | Dome 1 | Dome 2 |
| Travel to Peak Force | 1.0 mm | 1.0 mm |
| Peak Force | 1.25N | 1.25N |

| Dome Specification | | |
|---|---|---|
| Force Drop (F1-F2) | 50-40% of Peak | 50-40% of Peak |
| Travel to Electrical Contact | 3.6 mm | 3.3 mm |
| Force/Travel | System Values | |
| F1 | 5.2N | |
| F2 | 2.1N | |
| F3 | 1.47N | |
| S1 | 1.0 mm | |
| S2 | 3.3 mm | |

Figure 11:
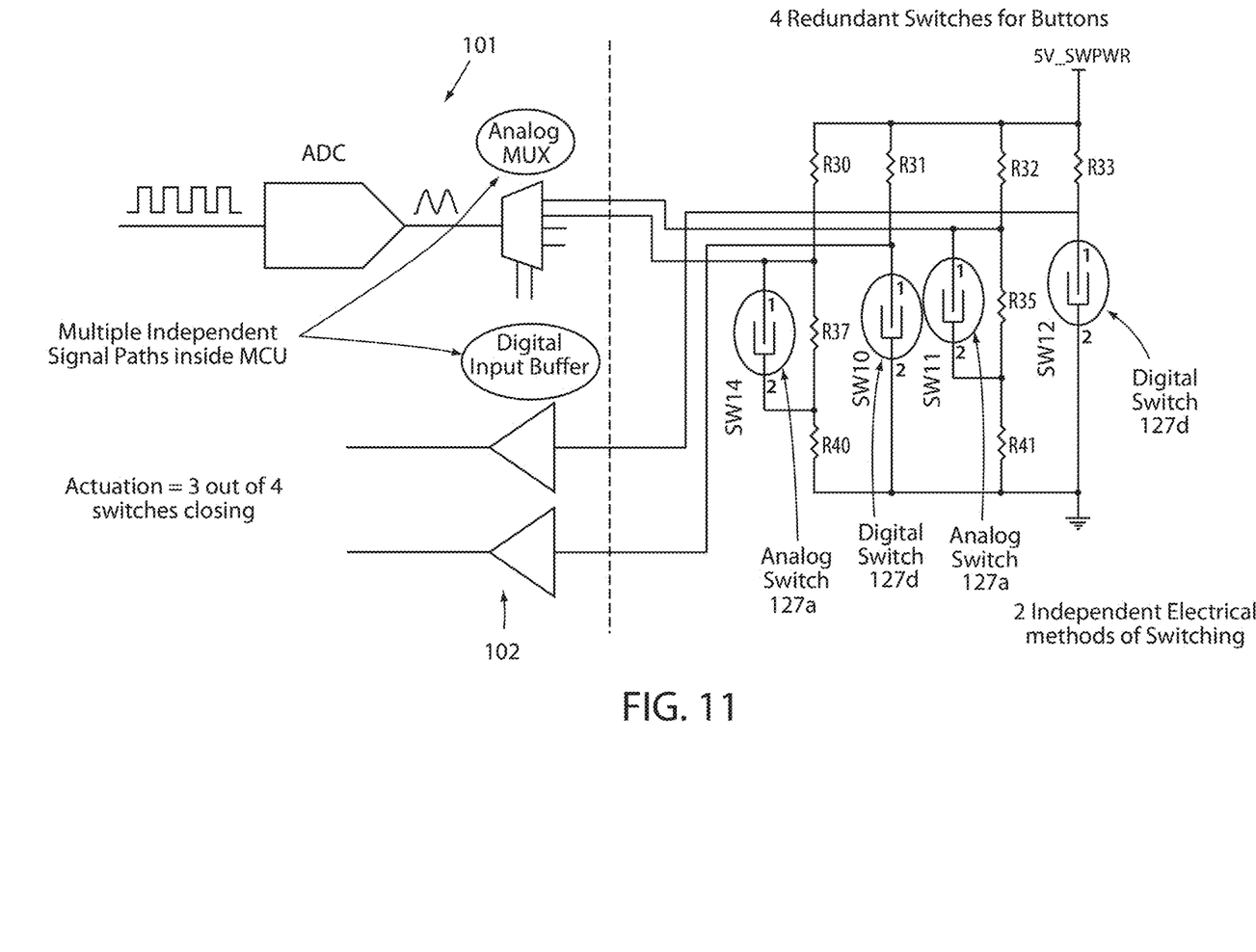
FIG. 11 is an electrical schematic including the dome switches above, and showing a master circuit including analog and digital circuits arranged to provide two independent methods of switching.

The electrical switches 127 may be operably connected to both analog and digital circuits 101 and 102, which provides additional functional advantage, reliability, and certainty of intentional operation. FIG. 11 is an electrical schematic including the dome switches 127 described above, and showing a master circuit 200 including the analog circuit 101 and the digital circuit 102 arranged to provide two independent methods of switching. The circuit in FIG. 11 would be implemented as each of a Park circuit, a Reverse circuit, a Neutral circuit, a Drive circuit, and optionally an Override circuit. Several innovative concepts are incorporated into the present apparatus. For example, the present shifter 100 combines digital signals and analog signal to determine a button actuation. The digital signals act according to typical CMOS inputs and, in software are equated to a typical digital on/off or I/O. For the analog signals, when a contact of a dome switch 127a makes contact with a contact on the PCB, the electrical switch 127a shorts out a resistor. Effectively, this causes the signal for that switch 127a to toggle between two voltages. These two voltages fall outside of the normal CMOS digital input range so the microcontroller needs to perform an analog to digital conversion to determine the signal voltage (the value typically is between 0 and 255 for an 8-bit conversion). For the digital signals, when a contact of a dome switch 127d makes contact with a contact on the PCB, the electrical switch 127d grounds one end of a resistor whose other end is coupled to 5V. Effectively, this causes the signal for that switch 127d to toggle between two voltages representing a digital value of "0" or "1". Combining the digital I/O and the analog value 0-255, the microcontroller determines whether the button is actuated or not actuated.

Also, redundancy is incorporated for reliability and other reasons. Redundancy is basically having multiple switches for one button to add redundant signal paths. This allows the system to survive single point failures. Also, this provides independence. Specifically, by having both analog and digital signal paths, it forces the system to use different and independent parts of the circuit and microcontroller. If there are failures in the digital section of the microcontroller, the analog section can still operate and provide results.

As shown in FIGS. 1-4, the shifter 100 may also include an optional override plunger 24 that is adjacent the Drive gear selector component 104. When depressed, the override plunger 24 slides downward through an aperture provided in the primary skeleton 3 and the secondary skeleton 21 to make contact with the associated electrical switches 127 underlying the plunger 24.

As shown in FIG. 3, the shifter 100 may also include a main printed circuit board 26 that underlies the dome keypad board 27 and is electrically coupled thereto for receiving switch activation signals and selectively powering the LEDs 130. The main printed circuit board 26, the dome keypad board 27, and the secondary plunger 12 of the Drive gear selector component 104 are positioned below the primary skeleton 3. The lower housing 25 lies underneath the main printed circuit board 26 to contain the main printed circuit board 26, the dome keypad board 27, and the secondary plunger 12. The upper housing 1 covers the primary skeleton 3 and all of the other components of the shifter 100.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A transmission shifter for a vehicle, comprising:
   a base defining Park, Reverse, Neutral, and Drive gear positions;
   at least two separate Park electrical switches mounted on the base and associated with the Park gear position;
   a Park gear selector component associated with the Park gear position and configured to actuate both of the Park electrical switches upon manipulation of the Park gear selector component;
   at least two separate Reverse electrical switches mounted on the base and associated with the Reverse gear position;
   a Reverse gear selector component associated with the Reverse gear position and configured to actuate both of the Reverse electrical switches upon manipulation of the Reverse gear selector component;
   at least two separate Neutral electrical switches mounted on the base and associated with the Neutral gear position;
   a Neutral gear selector component associated with the Neutral gear position and configured to actuate both of the Neutral electrical switches upon manipulation of the Neutral gear selector component;
   at least two separate Drive electrical switches mounted on the base and associated with the Drive gear position; and
   a Drive gear selector component associated with the Drive gear position and configured to actuate both of the Drive electrical switches upon manipulation of the Drive gear selector component,
   wherein the at least two separate Park, Reverse, Neutral, and Drive electrical switches each includes a first dome electrical switch and a second dome electrical switch, all of the first and second dome electrical switches being constructed to close at different times during movement of the associated Park, Reverse, Neutral, and Drive gear selector components.

2. The transmission shifter as defined in claim 1, wherein the Reverse gear selector component comprises a primary plunger that moves horizontally and a secondary plunger that moves downward as the primary plunger moves horizontally in a rearward direction, wherein the secondary plunger actuates both of the Reverse electrical switches upon moving downward.

3. The transmission shifter as defined in claim 2, wherein the Drive gear selector is supported in the base so as to move downward at an angle relative to a vertical axis when manipulated.

4. The transmission shifter as defined in claim 3, wherein the Park gear selector is supported in the base so as to move downward in a direction parallel to the vertical axis when manipulated.

5. The transmission shifter as defined in claim 4, wherein the Neutral gear selector is supported in the base so as to move downward in a direction parallel to the vertical axis when manipulated.

6. The transmission shifter as defined in claim 1, wherein the Drive gear selector is supported in the base so as to move downward at an angle relative to a vertical axis when manipulated.

7. The transmission shifter as defined in claim 1, wherein the Park gear selector is supported in the base so as to move downward in a direction parallel to a vertical axis when manipulated.

8. The transmission shifter as defined in claim 1 and further comprising:
   Park, Reverse, Neutral, and Drive circuits operably connected to the electrical switches, respectively, and associated with the Park, Reverse, Neutral, and Drive gear positions respectively;
   wherein at least one of the electrical switches for each of the Park, Reverse, Neutral, and Drive gear positions is configured to output an analog signal to a respective one of the Park, Reverse, Neutral, and Drive circuits; and
   wherein at least one other of the electrical switches for each of the Park, Reverse, Neutral, and Drive gear positions is configured to output a digital signal to a respective one of the Park, Reverse, Neutral, and Drive circuits.

* * * * *